United States Patent [19]

Bahu et al.

[11] Patent Number: 5,630,223
[45] Date of Patent: May 13, 1997

[54] ADAPTIVE METHOD AND APPARATUS FOR ELIMINATING INTERFERENCE BETWEEN RADIO TRANSCEIVERS

[75] Inventors: Mark B. Bahu, Ventura; Ashok K. Talwar, Westlake Village, both of Calif.; Guy R. Brossard, Cholet, France

[73] Assignee: American Nucleonics Corporation, Westlake Village, Calif.

[21] Appl. No.: 351,586

[22] Filed: Dec. 7, 1994

[51] Int. Cl.$^6$ .................................................. H04B 1/10
[52] U.S. Cl. .................... 455/296; 455/24; 455/278.1; 455/304
[58] Field of Search .................... 455/63, 24, 103, 455/115, 50.1, 126, 276.1, 278.1, 295, 296, 303, 304, 306, 84

[56] References Cited

U.S. PATENT DOCUMENTS

| 3,699,444 | 10/1972 | Ghose et al. | 325/21 |
| 5,065,120 | 11/1991 | Munn | 455/78 |
| 5,117,505 | 5/1992 | Talwar | 455/278.1 |
| 5,125,108 | 6/1992 | Talwar | 455/278.1 |
| 5,140,699 | 8/1992 | Kozak | 455/278.1 |
| 5,148,117 | 9/1992 | Talwar | 330/151 |
| 5,152,010 | 9/1992 | Talwar | 455/278.1 |
| 5,444,864 | 8/1995 | Smith | 455/24 |

FOREIGN PATENT DOCUMENTS

2171879  9/1986  United Kingdom ............... 455/24

*Primary Examiner*—Reinhard J. Eisenzopf
*Assistant Examiner*—Doris To
*Attorney, Agent, or Firm*—Hoffmann & Baron

[57] ABSTRACT

Adaptive apparatus for eliminating interference from a received signal provided on a transmission line caused by radio transceivers includes a plurality of frequency tunable filters tuned to the operating frequency of a corresponding transmitter. The transmitter signal of each transmitter is provided to a corresponding filter. The filter eliminates the non-essential transmission of harmonics, intermodulation and wideband noise of the transmission signal. The adaptive apparatus includes a plurality of cancellation devices wherein each cancellation device receives a sample of each filtered transmission signal and the received signal. The received signal includes an error portion generated by the transmitters and a non-error portion corresponding to the signal received by the antenna. Each cancellation device compares the corresponding sampled transmission signal with the sample of the received signal. A cancellation signal is generated by the cancellation device that is substantially equal to and opposite in phase to the error portion of the receive signal. The cancellation signals are then combined and amplitude and phase adjusted so that they have substantially the same amplitude but are 180° out of phase with the error portion. The combined error signal is injected onto the transmission line and provided to each of the frequency tunable filters.

29 Claims, 4 Drawing Sheets

ADAPTIVE METHOD AND APPARATUS FOR ELIMINATING INTERFERENCE BETWEEN RADIO TRANSCEIVERS

BACKGROUND OF THE INVENTION

1. Field of the Invention

The present invention relates generally to distortion suppression techniques, and more particularly to the elimination of interference between juxtaposed radio transceivers.

2. Description of the Prior Art

In order to accommodate spacing restrictions of multiple receive/transmit radio systems, it is preferable to collocate transceivers on a common platform. While the collocation of transceivers yields a radio system that is relatively small, the placement of transceivers in close proximity to one another produces cosite interference between transceivers. Cosite interference is caused by radiated and conducted interactions of transmitters and receivers. When the interference is severe, in-bound radio communications that are to be provided to a receiver can be totally disrupted and unrecognizable.

Unwanted (i.e., interfering) signals manifest themselves in several ways. Interference can cause a reduction in the sensitivity of a receiver (receiver desensitization), masking of a desired signal, tracking of an undesired interfering signal and loss of the desired signal, and processing of the unwanted interfering signal instead of the desired signal. Each of these manifestations of interference limits the communication capabilities of the radio system afflicted by this problem. The effects of interference can be some combination of the absence of usable output from a receiver, false signals from a receiver, and malfunction of a device which is operated by the receiver. During emergency situations, the loss and corruption of the desired signal can be critical.

Unwanted signal interference is generally caused by modulation of signals provided to the receiver by the carrier waves, or by the wideband noise, generated by collocated transmitters. Unwanted signal interference also occurs when frequency-hopping transmitters are transmitting signals at frequencies that are substantially close to the frequency of the desired receiver signal (i.e., co-channel operation). Unwanted signal interference is also caused by "pseudo white-noise" generated by transmitters over a wide band of frequencies on either side of the transmitter's operating frequency. It is often found in collocated transceiver systems that this "pseudo white-noise" reaches unacceptable levels within the operating band of adjacent receivers. Unwanted signal interference is also attributed to signals (i.e., spurious emissions) generated by transmitters at odd harmonics of the fundamental frequency of the transmitter output signal. This is caused by the non-linear transfer characteristics of transmitters. Moreover, signals received by an antenna can be corrupted when multiple antennas are used to transmit and receive RF (radio frequency) electronic signals. This type of interference is typically referred to as antenna pattern distortion. Antenna pattern distortion can occur even when all but one of the antennas of the multiple antenna arrangement is operating.

In order to substantially reduce and eliminate the undesired interfering signals while maintaining the spacial benefits afforded by proximately locating transceivers, especially frequency-hopping transceivers, several signal processing techniques have been proposed. These techniques include agile filtering, agile filtering with multicoupling and interference cancellation.

Agile (frequency hopping) filtering includes coupling a frequency adjustable filter to the input of a corresponding receiver wherein the filter has been tuned to the operating frequency of the receiver. The frequency tunable filter is preferably a bandpass filter which removes unwanted signals being transmitted outside the filter bandwidth. As a result of the agile filtering technique, the RF sensitivity and selectivity of the receiver to which the filter is coupled is increased. In addition, it follows that the jamming bandwidth of the collocated transmitters is substantially reduced. However, if the interfering signals generated by the transmitter fall within the frequency band of the receiver, since the filter is tuned to the operating frequency of the receiver, the filter will not remove the interfering signal and the desired signal will remain distorted.

Use of the agile filtering technique is dependent upon priority management of frequency plans. Priority management involves assigning a rank to each transceiver and monitoring their current operating frequency. If collocated transmitters and receivers are assigned substantially similar operating frequencies, the transmitter or receiver that has previously been judged to be subordinate to the primary transceiver is turned off until reassignment of operating frequencies occurs. Since transceiver operation is temporarily suspended, information that was being either transmitted to, or received by, the subordinate transceiver is lost. During emergency situations, the loss of this data can be critical.

The second technique, agile filtering with multicoupling, is similar to the above-described technique. However, the second scheme includes coupling all transceivers, along with their respective agile filters, to a single antenna in order to prevent antenna radiation pattern deformation. Following the first technique, the frequency tunable filters of the second scheme also operate in accordance with priority management. Therefore, this technique suffers from the same drawbacks as described above because transceivers are temporarily shut-off resulting in a loss of information.

Provided that priority management is practiced, each of the above two techniques provide improvement over the signal transmission/reception exhibited by systems which do not employ these schemes. However, when the frequency band for allocation is limited, and there are a relatively large number of transceivers, implementation of priority management results in the loss of substantial amounts of data because of frequent conflicts in frequency allocation.

A third technique that has been utilized to remove unwanted interfering signals from a desired signal is interference cancellation. Interference cancellation involves sampling the transmitter output signal in order to eliminate from the desired signal, any interfering signal having a frequency proximate to the transmitter carrier frequency. When the signal noise and spurious sidebands generated by the interfering transmitter are strong, interference cancellation is inadequate. In addition, since the frequency of the interfering signal may arbitrarily vary as compared to the carrier frequency of the signal being transmitted by the interfering transmitter, interference cancellation does not provide sufficient cancellation of wideband noise including transmitter "pseudo white-noise" and spurious emissions.

An alternative interference cancellation scheme involves the cancellation of substantially all interfering signals outside the receiver's operating frequency band. As a result, the receiver is substantially protected from both the interfering carrier frequency of the transmitter signal and its associated sidelobes. While the alternative interference cancellation scheme does eliminate some interfering signals generated by the transmitters, it does not eliminate interfering signals that have substantially the same frequency as the received signal. In addition, this alternative interference cancellation technique is difficult to implement due to its complexity and due to the requirement that it operate over a high dynamic frequency range of signals. This usually requires multiple cancellation loops which are relatively difficult to implement.

OBJECTS AND SUMMARY OF THE INVENTION

It is therefore an object of the present invention to provide a method and apparatus for reducing the effects of interference between collocated transceivers.

It is another object of the present invention to provide a method and apparatus in which proximately located frequency-hopping transceivers can simultaneously transmit and receive signals without substantially affecting the quality of a desired signal.

It is yet another object of the present invention to eliminate the effects of interference between collocated frequency-hopping transceivers utilizing both agile filtering and interference cancellation.

It is still another object of the present invention to provide a method and apparatus which eliminates the effects of interference between collocated transceivers without utilizing a priority management scheme.

It is still another object of the present invention to provide a method and apparatus for eliminating the effects of interference between collated transceivers that are coupled to a single antenna.

It is a further object of the present invention to provide a method and apparatus which provides satisfactory operation of collocated transceivers when an interfering signal and its associated spurious sidebands are strong.

It is still a further object of the present invention to provide a method and apparatus utilizing both agile filtering and interference cancellation in order to eliminate the detrimental effects of interference between collocated frequency-hopping transceivers.

It is still a further object of the present invention to provide a method and apparatus for eliminating the effects of interference between collocated transceivers which results in less signal loss when a signal is transmitted.

It is yet a further object of the present invention to provide a method and apparatus for the elimination of the effects of interfering signals between collocated transceivers which overcomes the inherent disadvantages of known apparatus and methods.

In accordance with one form of the present invention, the adaptive apparatus for reducing interference between collocated radio transceivers, wherein each transceiver has a communication port alternately providing a transmission signal to and receiving a received signal from an antenna, includes a plurality of filter circuits. Each of the plurality of filter circuits is electrically coupled to a corresponding transceiver for receiving a corresponding transmission signal. The apparatus also includes a coupling device electrically coupled to each of the plurality of filter circuits. The coupling device receives the transmission signals from each filter circuit and provides the signals to an antenna for transmission. The coupling device also receives signals from the antenna and provides these received signals on a reception channel port. The reception channel port is electrically connected to a transmission line.

Preferably, each filter circuit is tuned to the operating frequency of a corresponding transmitter. When a transmitter signal is provided from the transmitter to the filter circuit, the filter circuit will pass only those signals within the operating frequency band to which the filter has been tuned. Therefore, the filter eliminates the transmission of harmonics, intermodulation products and wideband noise generated by the transceiver thus reducing the possibility of interference with received signals provided on the transmission line.

The apparatus also includes a power splitter electrically coupled to the transmission line. The power splitter samples the received signal and provides a portion of the sampled received signal to each of a plurality of cancellation devices. Each of the plurality of cancellation devices is coupled to one of the plurality of filter circuits. Each cancellation device has a sample input port for receiving the received signal sample from the power splitter. Each cancellation device also has a reference input port which receives a sample of the transmission signal provided by a corresponding filter circuit. The cancellation device determines portions of the received signal sample that are coherent with the transmission signal sample. The cancellation device then generates a cancellation signal which is substantially equal to, and opposite in phase, to the portion of the received signal sample that is coherent with the transmission signal sample.

Each of the cancellation signals generated by the plurality of cancellation devices is provided to a power combiner which effectively combines the cancellation signals to provide a combined cancellation signal. The combined cancellation signal is injected onto the transmission line so as to substantially eliminate the portions of the received signal that are coherent with the transmission signals provided by each of the plurality of filter circuits.

The apparatus further includes an amplifier and power splitter coupled to the power combiner for amplifying and dividing the received signal. The power splitter provides the received signal to each of the plurality of filter circuits. Each filter circuit determines whether the received signal is within the operating frequency band of the filter circuit's transceiver. If the received signal is within the operating frequency of the corresponding transceiver, the filter circuit provides the received signal to the transceiver for processing. However, if the received signal is not within the operating frequency of the transmitter, the received signal is not passed to the transceiver.

As a result of the present invention, the non-essential transmission of harmonics, intermodulation products and wideband noise is limited by placing frequency tunable filters at the output of each transmitter. In addition, any remaining interfering signal that is within the passband of the frequency tunable filter is eliminated utilizing a cancellation device by placing a sample of the interfering signal in phase opposition with the interfering signal. Therefore, substantially all of the interfering signals generated by each of the transmitters are eliminated from the received signal.

A preferred form of the apparatus for eliminating interference between radio transceivers and method for doing the same, as well as other embodiments, objects, features and advantages will be apparent from the following detailed description of illustrative embodiments thereof, which is to be read in connection with the accompanying drawings.

DETAILED DESCRIPTION OF THE PREFERRED EMBODIMENT

Figure 1:
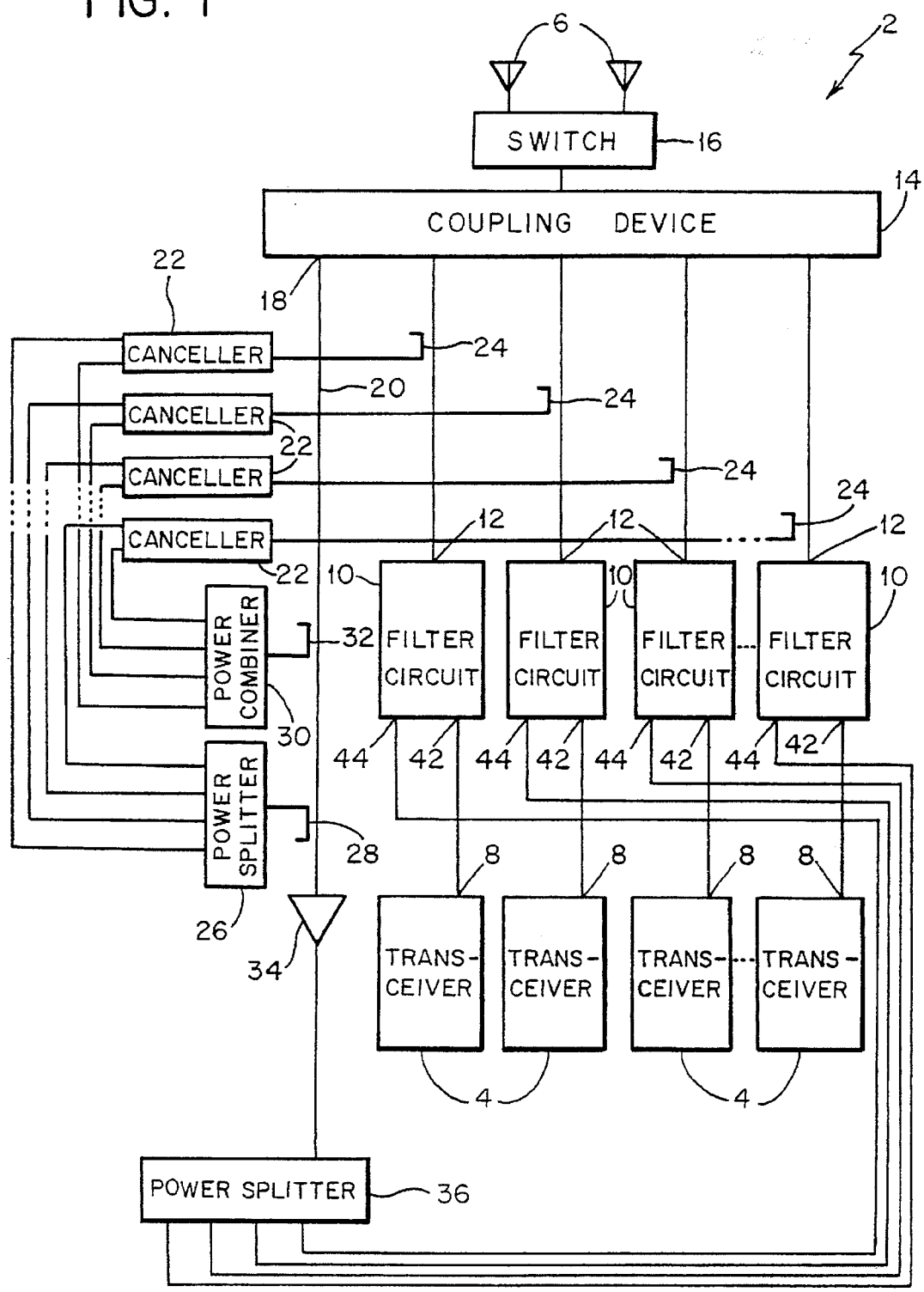
FIG. 1 is a functional diagram of one form of an adaptive apparatus for eliminating the effects of interference between radio transceivers in accordance with the present invention.

Referring now to the drawings, FIG. 1 illustrates one form of the adaptive apparatus for elimination of interfering signals between radio transceivers. The adaptive apparatus for the elimination of interfering signals between radio transceivers 2 is adapted to be coupled to a plurality of transceivers 4 or other type of device capable of transmitting and/or receiving electronic signals. The plurality of transceivers operating in the transmission mode (hereinafter referred to as transmitters) produce electronic signals for transmission via antenna 6. Substantially contemporaneously to this transmission, electronic signals are received by antenna 6 and provided to at least one of the transceivers operating in the receiving mode (hereinafter referred to as receivers). As is known to happen, in addition to the signals intended to be provided by antenna 6, the transmitters also generate noise and distortion signals which interfere with the electronic signals received by the antenna that are to be provided to a receiver.

Each transceiver 4 to which the adaptive apparatus 2 is coupled, alternately function as both an electronic signal transmitter and receiver depending upon the specific needs of a user. Each transceiver includes a communication port 8 for both transmitting signals from and providing signals to the transceiver. The transceivers are typically frequency-hopping transceivers that are collocated on a common platform, as shown in FIG. 1. The transceivers can operate in the high frequency (HF), very high frequency (VHF) and ultra-high frequency (UHF) spectrums.

The apparatus 2 includes a plurality of filter circuits 10. Each filter circuit is respectively coupled to the communication port 8 of a corresponding transceiver 4. The filter circuit is preferably designed to operate in both the transmission and reception modes (i.e., when the transceiver is operating as either a transmitter or receiver). As will be explained below, each filter circuit preferably includes a frequency adjustable bandpass filter (i.e., agile filter) tuned to the frequency of the transceiver 4 to which the filter circuit is coupled. In addition to the desired transmitter signal, transmitters also generate signals at harmonics of the fundamental frequency of the transmitter output signal due to the inherent nonlinear transfer characteristics of transmitters. Moreover, transmitters also generate "pseudo white-noise" over a wide band of frequencies on either side of the fundamental frequency of the transmitter output signal.

Each filter circuit 10 is designed to receive transmitter signals from a corresponding transmitter and remove (i.e., filter) the associated harmonics and out of band transmitter noise. This is performed to prevent the transmitter noise from appearing in a received signal provided by the antenna 6. Since the frequency adjustable filter of each filter circuit is tuned to the operating frequency of its corresponding transmitter, the filter circuit will pass substantially only the signal desired to be output. The filtered transmitter signal is provided on output port 12 of the filter circuit.

The output port 12 of each filter circuit 10 is electrically coupled to coupling device 14. The coupling device may be a multicoupler. Alternatively it can be made, as is known in the art, utilizing hybrid couplers to form a common reception channel and N transmission channels. Moreover, an alternative coupling device consists of a N-way power combinet/splitter. The coupling device receives the filtered transmission signal provided by each of the filter circuits 10. The coupling device serves to electrically couple each transmitter to antenna 6. Antenna 6 may consist of an HF, VHF and UHF antenna wherein a switch 16 selectively connects the coupling device 14 to a particular antenna.

The coupling device 14, in addition to providing filtered transmission signals to the antenna 6, also functions as a conduit for providing signals received by antenna 6 for processing by the apparatus of the present invention. Signals that are received by the antenna are provided through a reception channel port 18 of the coupling device. The received signals are preferably provided to transmission line 20 which is electronically coupled to reception channel port 18. As the received signal is provided to and along transmission line 20, interfering signals generated by the transmitters infiltrate the received signal carried on the transmission line. As a result, the transmission line signal provided along the transmission line 20 will include an error portion and a non-error portion. The non-error portion substantially corresponds to the signal received by antenna 6 while the error portion substantially corresponds to the interfering signals generated by the collocated transmitters.

In order to substantially eliminate the effect of the interfering signals (i.e., error portion of the transmission line signal) provided by each transmitter, a plurality of cancellation devices 22 are electrically coupled to the transmission line 20. In addition, each of the plurality of cancellation devices is coupled to the output port 12 of one of the plurality of filter circuits 10 so as to obtain a sample of the filtered transmission signal. In a preferred form of the present invention, a directional coupler 24 is operatively coupled to the output port 12 of a corresponding filter circuit 10 to provide the sample of the filtered transmission signal to its associated cancellation device. Each cancellation device will receive a sample of the filtered transmission signal corresponding to the filter circuit 10 and transmitter 4 to which it is coupled.

The adaptive apparatus 2 also includes power splitter 26. Preferably, the power splitter 26 includes a directional coupler 28 electrically coupled to the transmission line 20 for providing a sample of the transmission line signal (i.e., error portion and non-error portion) to the power splitter. The power splitter, as is known in the art, effectively divides the sample of the transmission line signal among each of the plurality of cancellation devices 22. Each cancellation device compares the sample of the transmission line signal with the sample of the filtered transmission signal and essentially detects the signal components of the transmission line signal sample that are coherent with the sample of the filtered transmission signal.

Each cancellation device 22 adjusts the amplitude and phase of its respective filtered transmission signal sample and provides a cancellation signal corresponding to the signal components of the transmission line signal sample that are coherent with the corresponding filtered transmission signal sample. The cancellation signal generated by each of the plurality of cancellation devices is provided to a power combiner 30. The power combiner includes a directional coupler 32 that is electrically coupled to transmission line 20. As is known in the art, the power combiner effectively combines the cancellation signals and provides a combined cancellation signal which is injected onto the transmission line by directional coupler 32. The combined cancellation signal is representative of the interfering signals provided by all of the transmitters. The combined cancellation signal, when injected onto transmission line, essentially has the same amplitude as the error portion of the transmission line signal, but is manipulated so that it is 180° out of phase with the transmission line signal so as to substantially cancel the error portion. As a result, the signal remaining on the transmission line is substantially the same as the received signal provided by antenna 6.

Electrically coupled to directional coupler 32 is an amplifier 34 for amplifying the signal remaining on the transmission line 20 after introduction of the combined cancellation signal. Amplifier 34 is preferably included to increase the strength of the signal remaining on transmission line 20. In the preferred embodiment, the amplifier is a linear, low noise amplifier in order to minimize the quantity of signal noise and distortion introduced to the (non-error portion of the transmission line signal) received signal.

Electronically coupled to amplifier 34 is a second power splitter 36. The power splitter is provided with the amplified received signal. Power splitter 36 preferably has at least one input port and a plurality of output ports respectively corresponding to the plurality of filter circuits 10. Each filter circuit is electrically coupled to an output of the power splitter and receives a portion of the amplified received signal provided to the power splitter.

Each filter circuit, which has been previously tuned to the frequency of its associated transceiver, provides the signal to its frequency tunable filter. If the signal provided to the filter circuit by the power splitter is within the operating frequency band of one of the transceivers, and if the transceiver is in the receive mode, the signal will pass through the filter circuit and be provided to the communication port of the transceiver (receiver) for processing. While passing through the filter circuit, the signal will also be modified to remove any latent signals that are outside the operating frequency of the receiver. However, if the received signal is not within the operating frequency band of a corresponding receiver and its respectively tuned filter circuit, the signal will be substantially eliminated by the filtering process. Therefore, the signal will not be forwarded to the receiver.

In an alternative form of the present invention, the adaptive apparatus for eliminating interference between radio transceivers may include a plurality of frequency adjustable filters. Specifically, a frequency adjustable filter may be coupled between the first power splitter 26 and each cancellation device 22, and/or between each directional coupler 24 and its corresponding cancellation device 22. In addition, a frequency adjustable filter may be coupled between the power splitter 30 and each transceiver 4 if the filter circuit 10 is not operating as a bandpass filter in the receive mode. In another embodiment of the present invention, each transceiver is coupled to a switch which, during transmission, directly couples the transmitter communication port 8 to the coupling device 14 and during reception, couples the receiver communication port 8 to the filter circuit 10 so that the received signal can be passed through the frequency adjustable filter of the filter circuit 10. When the switch directly provides the transmission signal to the coupling device, filtering of the transmission signal occurs within the coupling device.

Figure 2A:
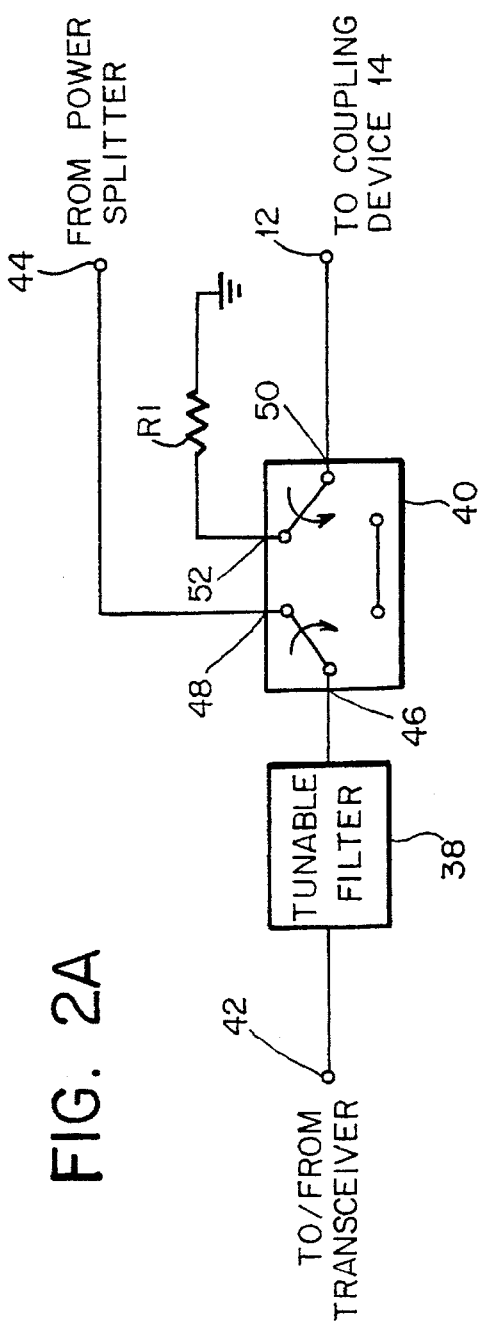
FIG. 2A is a functional block diagram of one form of a filter circuit for simplex operation for use in the adaptive apparatus of FIG. 1.

Referring now to FIG. 2A, one form of the filter circuit 10 which can be utilized in the present invention is shown. The filter circuit 10 preferably includes a frequency tunable filter 38 and a switching device 40. In a preferred embodiment, the frequency tunable filter is electrically coupled to a control circuit (not shown) including control logic for automatically tuning the tunable filter to the operating frequency assigned to its corresponding transceiver 4. As previously mentioned, the transceivers to which the adaptive apparatus is coupled are preferably frequency hopping devices which alter their operating frequency numerous times per second. The tunable filter that is utilized in the filter circuit must be capable of instantaneously altering its bandpass frequency in order to properly pass signals to and from the transceiver. In a preferred embodiment, the tunable filter 38 is capable of filtering signals that are provided into either of its two connection ports.

The filter circuit 10 preferably has a transceiver port 42 which is operatively coupled to the communication port 8 of a corresponding transceiver 4 so as to provide signals to and receive signals from the transceiver. The filter circuit also has a received signal port 44 for receiving the received signal from power splitter 36. As previously stated, the filter circuit also includes a switching device 40 which, in the preferred embodiment, is a double pole, double throw switch. The switching device includes first, second, third and fourth connection ports 46, 48, 50 and 52, respectively. In its preferred embodiment, the tunable filter is coupled between the transceiver port 42 and the first connection port 46 of the switching device. The second connection port 48 of the switching device is electrically coupled to the received signal port 44 of the filter circuit for receiving a portion of the received signal from the power splitter 36. The third connection port 50 of the switching device is electrically coupled to the coupling device 14. The fourth connection port is coupled, through a resistor, to a ground potential.

In a preferred embodiment of the invention, the switching device 40 operates to switch the transceiver between the transmit and receive modes. Specifically, the switching device alternately couples the tunable filter 38 (and ultimately the transceiver) to either the power splitter 36 or the coupling device 14. When the tunable filter is coupled to the power splitter 36, the received signal will be provided through switch 40 to tunable filter 40 as shown in the figure. If the frequency of the received signal is within the bandpass frequency to which the tunable filter is set, the signal will be provided to the receiver for processing therein. However, if the received signal is not within the bandpass frequency of the tunable filter, no signal will pass to the receiver.

When the transceiver is operating as transmitter, switching device 40 will effectively couple the tunable filter to the coupling device 14 (i.e., the switch mechanism will be rotated as indicated by the arrows in FIG. 2A). Therefore, signals being transmitted by the transmitter will be provided to tunable filter 38 and thereafter transmitted through the third port 50 of the switching device to the coupling device for transmission by antenna 6. As a result of the switching device, when the transmitter is in the transmit mode, any signal that the power splitter 36 attempts to provide to the transceiver will be terminated.

Figure 2B:
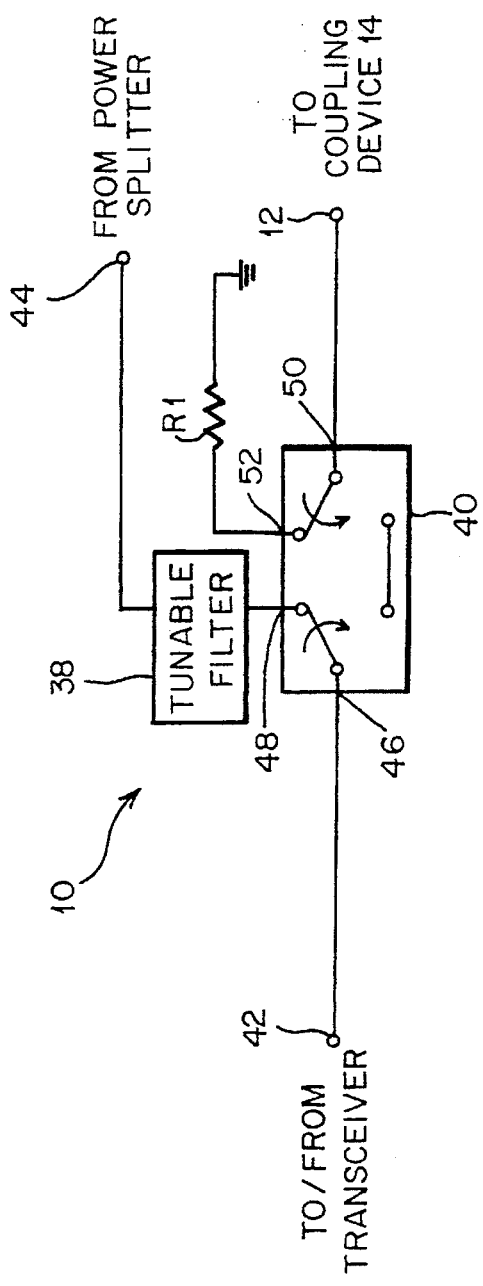
FIG. 2B is a functional block diagram of an alternative form of a filter circuit for simplex operation for use in the adaptive apparatus of FIG. 1.

Referring now to FIG. 2B, an alternative embodiment of the switching circuit is shown. The embodiment of FIG. 2B differs from that shown in FIG. 2A in that the tunable filter 38 is coupled between the second connection port 48 of the switching device 40 and the received signal port 44. As a result of this embodiment, the tunable filter 38 will only filter signals received from the power splitter 36. When the transceiver is in the transmission mode and the switching device is appropriately configured as indicated by the arrows, the transmission signals generated by the transmitter will proceed to the coupling device 14 without passing frequency tunable filter 38. However, in this embodiment, it is envisioned that the coupling device will include a filter which is tuned to the operating frequency of the transmitter in order to remove the odd harmonics and "pseudo white-noise" before transmission by the antenna 6.

Figure 3:
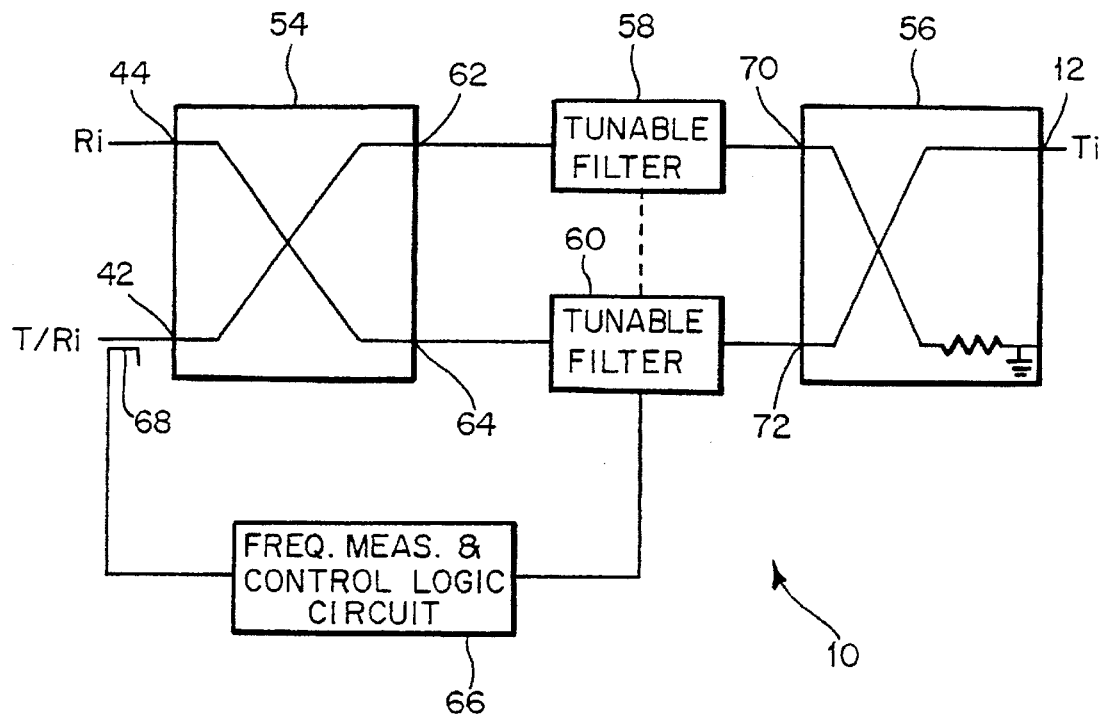
FIG. 3 is a functional block diagram of one form of a filter circuit for duplex operation for use in the adaptive apparatus of FIG. 1.

Referring now to FIG. 3, one form of the filter circuit 10 for duplex operation is shown. The filter circuit includes a 90° hybrid coupler 54, a second 90° hybrid coupler 56 and first and second frequency adjustable filters 58, 60. In a preferred embodiment, the first hybrid coupler has an input port 44 which is coupled to power splitter 36 for receiving a portion of the received signal. Input port 44 is a one-way port which permits signals to enter the coupler but does not allow the signal to exit via the same port. The first hybrid coupler also has a second port 42 which is electrically coupled to the communication port 8 of a corresponding transceiver 4 for receiving signals from and providing signals to the transceiver. As implied, the second port permits signals to both enter and exit the coupler. The first hybrid coupler also has first and second output ports 62, 64 respectively.

Electrically coupled to the first and second output ports 62, 64 are first and second frequency adjustable filters 58, 60. In a preferred embodiment, and as is known in the art, a frequency measurement and control logic circuit 66 having a directional coupler 68, is electrically connected to the second port 42 of the first hybrid coupler 54 to measure the instantaneous frequency of signals being transmitted from the transmitter through the second port. The frequency measurement and control logic circuit 66 automatically tunes the first and second frequency adjustable filters 58, 60 to the frequency of the transmitter signals provided through the second port 42. Alternately, frequency information is obtained directly from the transceiver to which filter circuit 10 is connected.

In the preferred embodiment, the second hybrid coupler 56 has two input ports 70, 72 respectively coupled to the first and second tunable filters 58, 60. The second hybrid coupler also has an output port corresponding to the output port 12 of the filter circuit 10 for providing transmission signals to the coupling device 14. A fourth port of the second hybrid coupler is coupled to ground through a resistor so that no signals will be provided therethrough.

The filter circuit of FIG. 3 operates as follows. As is known in the art, after a received signal is provided at input port 44 of the first hybrid coupler 54, the received signal is divided into two signal components that are 90° out of phase. These signal components appear at the first and second output ports 62, 64 of the first hybrid coupler 54. In the preferred embodiment, the first and second tunable filters 58, 60 are tuned to a frequency outside the spectrum of available frequencies so that no signals will pass. Alternatively, each tunable filter includes a switch which when opened, creates an open circuit. As a result, the two signal components are reflected at output ports 62, 64 toward second port 42. The 90° hybrid coupler inherently combines the two signal components in phase. The combined signal is provided through the second port 42 to a corresponding transceiver where the signals are filtered to determine if this signal is properly received by the receiver.

As soon as a signal is provided through the second port 42 to the transceiver 4 at a frequency which the receiver is monitoring, the transceiver switches from receiver operation to transmitter operation and begins transmitting signals on its assigned frequency. The frequency of the signals provided by the transmitter is measured instantaneously by the frequency measurement and control logic circuit 66 and its corresponding directional coupler 68. Simultaneously, the filters are tuned to the frequency of the transmitter signal in order to permit transmission by the antenna.

The transmitter signal provided by the transmitter is separated by the first hybrid coupler 54 into two components as previously described in connection with the received signal. The two signal components, which are 90° out of phase, are provided to the first and second tunable filters wherein any portion of the signal component that is out of band is eliminated from either component of the transmitter signal. The filtered signal components are then provided to corresponding input ports 70, 72 of the second hybrid coupler 56. The second hybrid coupler combines the two signal components in phase so that a signal substantially representing the transmitter signal is provided with minimal losses. Since one of the output ports of the second hybrid coupler is a termination, the combined signal is provided at the output port 12 of the second hybrid coupler 56. The signal is then provided to the coupling device 14 for transmission by antenna 6.

The advantage of utilizing hybrid couplers of the present embodiment is that less losses are encountered as compared to traditional switching devices utilized as shown in FIGS. 2A and 2B.

Figure 4:
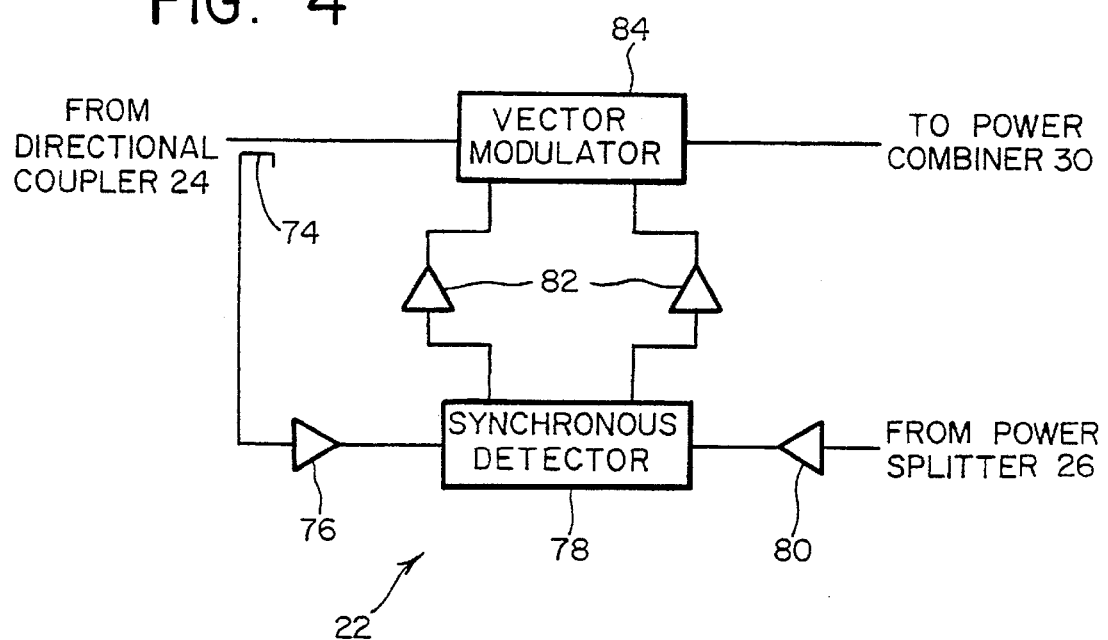
FIG. 4 is a functional block diagram of one form of a cancellation device for use in the adaptive apparatus of FIG. 1.

Referring now to FIG. 4, each cancellation device 22 basically includes a directional coupler 74 electrically coupled to directional coupler 24. Directional coupler 74 samples the signal provided by directional coupler 24 and provides the sampled signal to amplifier 76 for amplification. The amplifier is preferably a linear low noise amplifier so as not to introduce a significant amount of signal noise and distortion in the sampled signal. The amplified sample signal is then provided to a synchronous detector 78.

The synchronous detector 78, has at least two input ports wherein a first is coupled to amplifier 76 and the second is electrically coupled through amplifier 80, to a corresponding output port of the power splitter 26. The synchronous detector is basically a quadrature-phase detector. A typical synchronous detector which is suitable for use in the present cancellation device is described in U.S. Pat. No. 3,999,444, which issued to Rabindra Ghose and Walter Sauter, the disclosure of which is incorporated herein by reference. The synchronous detector compares the signal provided by the power splitter with the sample signal provided by directional coupler 74 and provides one or more detector output signals.

The interference canceller may also include amplifiers and/or an integrators 82 connected to the output of the synchronous detector 78. As a result, the output signals of the detector will be amplified and integrated to create control signals that are provided to a vector modulator 84.

A vector modulator 84, also known as a signal controller, which is suitable for use in the cancellation device 22 is described in U.S. Pat. No. 3,699,444, mentioned previously. In its most simple form, the vector modulator consists of an in-phase and a quadrature-phase electronic attenuator, each being controllable by a respective DC control signal. One of the input ports of the vector modulator is provided with a portion of the sampled filtered transmission signal from directional coupler 24. Another input of the vector modulator receives the control signals from the amplifiers/ integrators 82. An output signal, of the vector modulator, corresponding to the cancellation signal, is provided to the power combiner 30. The cancellation signal corresponds to the portions of the transmission line signal sample that are coherent with the transmission signal sample of a respective transmitter.

The vector modulator 84 provides its cancellation signal to the power combiner 30 which, effectively combines the cancellation signals generated by each interference canceller 22. Thereafter, as previously explained, the power combiner injects the combined cancellation signal onto transmission line 20 to substantially cancel the noise and distortion component (error portion) of the transmission line signal.

An example of an interference canceller 24 which may be used in the present invention is specifically set forth and described in: "Interference Cancellation System For Interference Signals Having An Arbitrary And Unknown Duration And Direction", filed Dec. 29, 1989, Ser. No. 07/458,901, now abandoned; "Highly Directive Radio Receiver Employing Relatively Small Antennas", filed Dec. 29, 1989, Ser. No. 07/458,842, now U.S. Pat. No. 5,152,010; "Interference Cancellation System Having Noise Reduction Features And Method", filed Feb. 22, 1990, Ser. No. 07/483,543, now U.S. Pat. No. 5,117,505, "Interference Cancellation System for Interference Signals Received with Differing Phase", filed Feb. 22, 1990, Ser. No. 07/423,900, now U.S. Pat. No. 5,125,108, and "Adaptive Feed-Forward Method and Apparatus For Amplifier Noise Reduction", filed Nov. 25, 1991, Ser. No. 07/797,788, now U.S. Pat. No. 5,148,117, the inventor of each of which is Ashok K. Talwar, and in the publication "Antenna Spacing Consideration In An Interference Canceller", by Ashok K. Talwar, published in IEEE Transactions on Broadcasting, Vol. 36, No. 3, pp. 203–06, Sep. 1990. The disclosure of each of these references is incorporated herein by reference.

Figure 5:
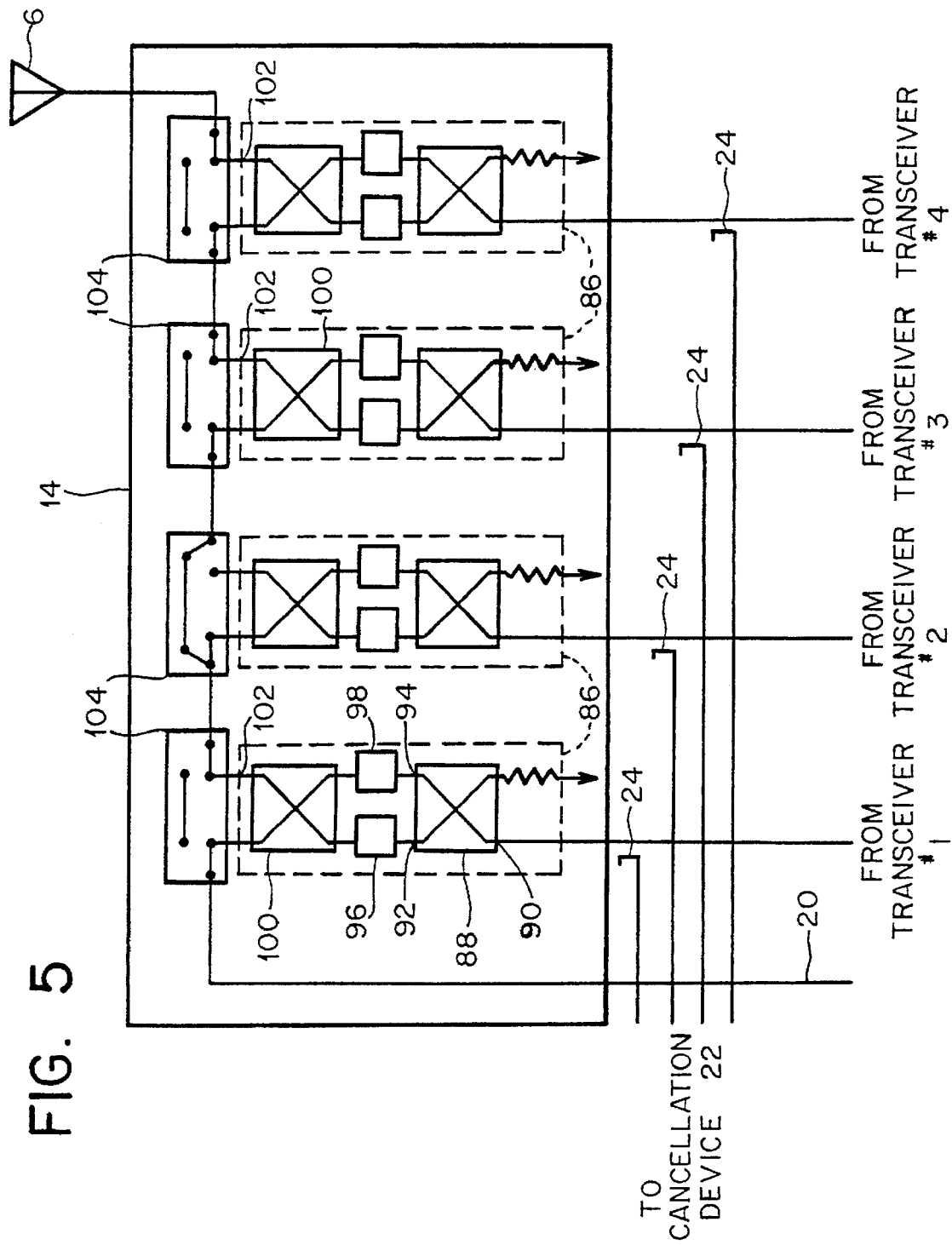
FIG. 5 is a functional block diagram of one form of a coupling device utilized in the adaptive apparatus of FIG. 1.

Referring now to FIG. 5, an embodiment of the coupling device 14 is shown. The coupling device 14 includes a plurality of hybrid coupler circuits 86, similar in configuration to the filter circuit shown in FIG. 3. Each of the plurality hybrid coupler circuits respectively corresponding to one of the plurality of transceivers 4. Each hybrid coupler circuit preferably includes a first 90° hybrid coupler 88 having an input port 90 coupled to a corresponding transceiver, and first and second output ports 92, 94. The input port 90 of the first hybrid coupler 88 receives the transmission signal from its corresponding transceiver and, as is known in the art, provides two signal components at the first and second output ports 92, 94 respectively. Coupled to the first and second output ports are first and second frequency adjustable filters 96, 98 which are preferably tuned to the frequency of the transmission signal in order to pass the transmission signal. The tuning of the frequency adjustable filters can be accomplished by any method as known in the art.

The coupling device 14 also includes a second hybrid coupler 100 for receiving the two signal components provided by the first and second frequency tunable filters 96, 98. The second hybrid coupler 100, as is known in the art, combines the two signal components and provides the combined signal on the first output port 102 of the second hybrid coupler for transmission by antenna 6. The coupling device also includes switch device 104 which provides means to allow a signal either provided to or received from antenna 6 to by-pass a particular hybrid coupler circuit 86. Switch device 104 is preferably a double pole, double throw device. As shown in FIG. 6, the hybrid coupler circuits coupled to either transceivers 1, 3 or 4 are in the transmit mode since switch device 104 has effectively coupled the hybrid coupler circuit to antenna 6. However, the hybrid coupler circuit connected to transceiver 2 is not capable of transmitting signals to the antenna because of the positioning of switch device 104. Therefore, the hybrid coupler connected to transceiver 2 is in the receive mode.

The operation of the coupling device of FIG. 5 will now be explained. When transceivers 4 are in the transmit mode, switch device 104 is manipulated so as to electrically couple the corresponding hybrid coupler circuit 86 to the antenna 6. In addition, the first and second frequency adjustable filters 96, 98 that are coupled between the first and second hybrid couplers 88, 100 are tuned to the frequency of the signal provided by the transmitter so as to pass the transmission signal to the second hybrid coupler. Referring now to the hybrid coupler circuit for transceiver #1, when the transmitter signal exits the first output port 102 of second hybrid coupler 100, it travels toward the antenna 6. Since the second transceiver is in the receive mode, the transmitter signal enters switch device 104 for the second hybrid coupler circuit which effectively causes the transmitter signal to by-pass the second hybrid coupler circuit.

The transmitter signal of transceiver #1 will be directed by the switch device 104 coupled to the third hybrid coupler circuit. However, since the hybrid coupler has one way ports and since the frequency adjustable filters of the third hybrid coupler are tuned to the frequency of the transmitter signal produced by transmitter #3 and not the signal produced by transmitter #1, the signal will not pass through this hybrid filter circuit. Instead, the entire signal of transmitter #1 is reflected within the second hybrid coupler 100 of the hybrid coupler circuit for transceiver #3 and the transmission signal of transceiver #1 appears at the output port 102 of this hybrid coupler circuit. The signal will then enter the hybrid coupler circuit associated with transceiver #4 and, after being reflected at the output port, be provided to the antenna 6 for transmission.

For reception, since the frequency adjustable filters are preferably tuned to the operating frequency of the transceiver, the hybrid coupler circuit 86 that is coupled to a receiver will activate switch device 104 in order to by-pass the corresponding hybrid coupler circuit. Alternately, the frequency adjustable filters 96, 98 of the hybrid coupler circuit that is in the receive mode are preferably tuned to a frequency outside of the band of interest of the receiver so that the signal provided by the antenna is reflected and provided out reception channel port 18 to transmission line 20.

The advantage of utilizing a coupling device as described and shown in FIG. 5 is that less signal loss is encountered as compared to multicouplers which utilize traditional splitters/combiners. This occurs not only because the hybrid couplers are low loss devices, but because switch device 104 acts to bypass specific hybrid coupler circuits. In addition, filtering of the transmission occurs in the coupling device and therefore filter circuit 10 as shown in FIG. 1 is not required.

As a result of the present invention, even though transceivers are collocated in a radio system, the effects of transmitter noise on signals being received is substantially eliminated. By placing frequency adjustable filters, that are tuned to the operating frequency of an associated transmitter, on the output of the corresponding transmitter, the transmission of harmonics, intermodulation products and wideband noise are eliminated by limiting the frequency band occupied by the transmitter output signals. This reduces the possibility of noise and distortion affecting the desired signal. However, noise and distortion still affect the desired signal due to reflection of the transmitter signal off the antenna and the lack of perfect isolation. Therefore, a cancellation device is included to remove noise and distortion generated after filtering. The cancellation device removes interfering signals having a frequency capable of being passed by the frequency adjustable filters. Therefore, broadband and narrowband protection of the desired signal is afforded by the present invention.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed:

1. Apparatus for reducing interference between a plurality of transceivers, each of the plurality of transceivers having a communication port alternately providing a transmission signal to and receiving a received signal from a first antenna, each transceiver having an operating frequency, the apparatus comprising:
   a) a plurality of filter circuits, each of the plurality of filter circuits being electrically coupled to a corresponding transceiver for receiving a corresponding transmission signal therefrom, each filter circuit filtering a corresponding transmission signal, each of the plurality of filter circuits also having an output port for providing the filtered transmission signal thereon;
   b) a coupling device being electrically coupled to each of the plurality of filter circuits for receiving filtered transmission signals from each of the plurality of filter circuits, the coupling device also being electrically coupled to the first antenna for one of providing the transmission signals to and receiving the received signal from the first antenna, the coupling device having a reception channel port for providing the received signal to a transmission line; and
   c) a plurality of cancellation devices, each of the plurality of cancellation devices having a reference input port and a sample input port, the reference input port of each cancellation device being coupled to an output port of a corresponding filter circuit for receiving a sample of the corresponding transmission signal, the sample input port of each cancellation device being electrically coupled to the transmission line for receiving a sample of the received signal, the received signal sample having an error portion and a non-error portion, each cancellation device further having an output port and generating thereon a cancellation signal which is substantially equal to and opposite in phase to the error portion of the received signal attributed to a corresponding filter circuit output port, each of the plurality of cancellation devices injecting a respective cancellation signal onto the transmission line so as to substantially eliminate the error portion from the received signal to provide a modified received signal, the modified received signal being provided to each of the plurality of filter circuits for processing therein.

2. Apparatus for reducing interference between a plurality of transceivers as defined by claim 1 further comprising a first power splitter being electrically coupled to the transmission line for acquiring a portion of the received signal, the power splitter dividing the portion of the received signal among a plurality of first power splitter output ports and providing each of the divided portions of the received signal to the sample input port.

3. Apparatus for reducing interference between a plurality of transceivers as defined by claim 1 further comprising a power combiner being electrically coupled to the output port of each of the plurality of cancellation devices so as to receive each of the cancellation signals, the power combiner effectively combining the cancellation signals to provide a combined cancellation signal, the power combiner injecting the combined cancellation signal onto the transmission line so as to substantially eliminate the error portion from the received signal to provide the modified received signal.

4. Apparatus for reducing interference between a plurality of transceivers as defined by claim 1 further comprising a power splitter being electrically coupled to the transmission line for receiving the modified received signal, the power splitter dividing the modified received signal among a plurality of power splitter output ports, each of the plurality of power splitter output ports being coupled to a corresponding filter circuit for providing a corresponding power splitter output signal thereto for processing therein.

5. Apparatus for reducing interference between a plurality of transceivers, each of the plurality of transceivers having a communication port alternately providing a transmission signal to and receiving a received signal from a first antenna, each transceiver having an operating frequency, the apparatus comprising:
   a) a plurality of filter circuits, each of the plurality of filter circuits being electrically coupled to a corresponding transceiver for receiving a corresponding transmission signal therefrom, each filter circuit filtering a corresponding transmission signal, each of the plurality of filter circuits also having an output port for providing the filtered transmission signal thereon;
   b) a coupling device being electrically coupled to each of the plurality of filter circuits for receiving filtered transmission signals from each of the plurality of filter circuits, the coupling device also being electrically coupled to the first antenna for one of providing the transmission signals to and receiving the received signal from the first antenna, the coupling device having a reception channel port for providing the received signal to a transmission line; and
   c) a first power splitter being electrically coupled to the transmission line for acquiring a portion of the received signal, the power splitter dividing the portion of the received signal among a plurality of first power splitter output ports;
   d) a plurality of cancellation devices, each of the plurality of cancellation devices having a reference input port and a sample input port, the reference input port of each cancellation device being coupled to an output port of a corresponding filter circuit for receiving a sample of the corresponding transmission signal, the sample input port of each cancellation device being electrically coupled to a corresponding first power splitter output port to receive a sample of the received signal, the received signal sample having an error portion and a non-error portion, each cancellation device further having an output port and generating thereon a cancellation signal which is substantially equal to and opposite in phase to the error portion of the received signal attributed to a corresponding filter circuit output port;
   e) a power combiner being electrically coupled to the output port of each of the plurality of cancellation devices so as to receive each of the cancellation signals, the power combiner effectively combining the cancellation signals to provide a combined cancellation signal, the power combiner injecting the combined cancellation signal onto the transmission line so as to substantially eliminate the error portion from the received signal to provide a modified received signal; and f) a second power splitter being electrically coupled to the transmission line for receiving the modified received signal, the second power splitter dividing the modified received signal among a plurality of second power splitter output ports, each of the plurality of second power splitter output ports being coupled to a corresponding filter circuit for providing a corresponding second power splitter output signal thereto for processing therein.

6. Apparatus for reducing interference between a plurality of transceivers as defined by claim 5 further comprising an amplifier coupled between the coupling device reception channel port and the second power splitter.

7. Apparatus for reducing interference between transceivers as defined by claim 5 further comprising a second antenna alternately coupled to the coupling device.

8. Apparatus for reducing interference between a plurality of transceivers as defined by claim 7 further comprising a switch electrically connected to the coupling device, the switch alternately electrically connecting the coupling device to one of the first antenna and the second antenna.

9. Apparatus for reducing interference between a plurality of transceivers as defined by claim 5 wherein the first power splitter includes a directional coupler for electrically coupling the power splitter to the transmission line.

10. Apparatus for reducing interference between a plurality of transceivers as defined by claim 5 wherein the power combiner includes a directional coupler for electrically coupling the power combiner to the transmission line.

11. Apparatus for reducing interference between a plurality of transceivers as defined by claim 5, each of the plurality of the cancellation devices including a directional coupler connected to the reference input port for electrically coupling the cancellation devices to an output port of a corresponding filter circuit.

12. Apparatus for reducing interference between a plurality of transceivers as defined by claim 5, each of the plurality of filter circuits including a frequency tunable filter and a switching device, the frequency tunable filter being adjusted to the operating frequency of a corresponding transceiver.

13. Apparatus for reducing interference between a plurality of transceivers as defined by claim 12, each of the plurality of filter circuits having a transceiver port for one of providing signals to and receiving signals from a transceiver and a received signal port for receiving the modified received signal from the second power splitter, the switching device having at least first, second and third connection ports, the tunable filter being coupled between the transceiver port and the first connection port of the switching device, the second connection port being electrically coupled to the received signal port for receiving the modified received signal, the third connection port being electrically coupled to the coupling device, the switching device alternately electrically coupling the tunable filter to one of the second power splitter and the coupling device.

14. Apparatus for reducing interference between a plurality of transceivers as defined by claim 12, each of the plurality of filter circuits having a transceiver port for one of receiving signals from and providing signals to a transceiver and a received signal port for receiving the modified received signal from the second power splitter, the switching device having at least first, second and third connection ports, the frequency tunable filter being coupled between the second power splitter and the second connection port, the first connection port being electrically coupled to a communication port of a corresponding transceiver, the third connection port being electrically coupled to the coupling device, the switching device alternately electrically coupling the transceiver communication port to one of the second power splitter and the coupling device.

15. Apparatus for reducing interference between a plurality of transceivers as defined by claim 5, each of the plurality of filter circuits comprises first and second hybrid couplers and first and second tunable filters, the first and second tunable filters being adjusted to the operating frequency of a corresponding transceiver, the first hybrid coupler having a first port for receiving the modified received signal from the second power splitter, the first hybrid coupler having a second port for one of providing the modified received signal to and receiving the transmission signal from a corresponding transceiver, the first hybrid coupler having third and fourth ports for providing the transmission signal thereon, the first and second tunable filters being respectively electrically coupled to the third and fourth ports of the first hybrid coupler for receiving the transmission signal and reflecting the modified received signal to the second port, the second hybrid coupler having first and second input ports and an output port, the output port being coupled to the coupling device, the first and second input ports of the second hybrid coupler being respectively coupled the first and second tunable filters for receiving the transmission signal, the transmission signal being provided on the output port of the second hybrid coupler to the coupling device.

16. Apparatus for reducing interference between a plurality of transceivers as defined by claim 5 wherein the coupling device is a multicoupler.

17. Apparatus for reducing interference between a plurality of transceivers as defined by claim 5 wherein the coupling device comprises at least one power combiner.

18. Apparatus for reducing interference between transceivers as defined by claim 5 wherein each of the plurality of cancellation devices comprises:

a) a first directional coupler electrically coupled to the output port of one of the plurality of filter circuits for sampling a corresponding transmission signal;

b) a synchronous detector electrically coupled to the first directional coupler for receiving the sampled transmission signal, the synchronous detector being electrically coupled to the first power splitter and receiving a portion of the received signal, the synchronous detector comparing the sampled transmission signal with the portion of the received signal and generating first and second output signals in response thereto, the synchronous detector providing first and second vector modulator control signals; and c) a vector modulator electrically coupled to the synchronous detector for receiving the first and second vector modulator control signals, the vector modulator also being electrically coupled to the first directional coupler and receiving the sampled transmission signal, the vector modulator altering the amplitude and phase of the sampled transmission signal and providing a cancellation signal to the power combiner.

19. Apparatus for reducing interference between a plurality of transceivers as defined by claim 18, wherein each of the plurality of cancellation devices further comprises:

an amplifier coupled between the first directional coupler and the synchronous detector for amplifying the sampled transmission signal.

20. Apparatus for reducing interference between a plurality of transceivers as defined by claim 18, wherein each of the plurality of cancellation devices further comprises:

an amplifier coupled to the synchronous detector for receiving and amplifying the portion of the received signal, the amplifier providing the amplified received signal to the synchronous detector.

21. Apparatus for reducing interference between a plurality of transceivers as defined by claim 18, wherein each of the plurality of cancellation devices further comprises:

first and second integrators respectively coupled between the synchronous detector and the vector modulator.

22. Apparatus for reducing interference between a plurality of transceivers as defined by claim 5, wherein the coupling device comprises:

a plurality of hybrid coupler circuits, each of the plurality of hybrid coupler circuits being coupled to a corresponding transceiver for receiving transmission signals therefrom and providing the transmission signals to the first antenna, a plurality of switch devices, each of the plurality of switch devices alternately electrically coupling a corresponding hybrid coupler circuit to the first antenna, the transceiver to which a corresponding hybrid coupler circuit is connected being in transmission mode when the hybrid coupler circuit is coupled to the first antenna, the transceiver to which a corresponding hybrid coupler is connected being in reception mode when the hybrid coupler circuit is uncoupled to the first antenna.

23. Apparatus for reducing interference between a plurality of transceivers as defined by claim 22, the plurality of hybrid coupler circuits including first and second hybrid couplers and first and second frequency adjustable filters, the first and second frequency adjustable filters being coupled between the first and second hybrid couplers, the first hybrid coupler being electrically coupled to a corresponding transceiver for receiving the transmission signal, the second hybrid coupler being electrically connected to a corresponding switch device for providing the transmission signal to the first antenna.

24. A method for eliminating, from a received signal, a transmitter noise and distortion signal component generated by a transceiver, the method comprising:

a) adjusting a frequency tunable filter circuit to an operating frequency of a corresponding transceiver;

b) filtering a transmitter output signal with the frequency tunable filter;

c) sampling the filtered transmitter output signal;

d) providing the sample of the filtered transmitter output signal to an interference canceler;

e) sampling a received signal, the received signal including a substantially undistorted signal component and a transmitter noise and distortion signal component;

f) providing the sample of the received signal to the interference canceler;

g) comparing the filtered transmitter output signal and the received signal and generating a cancellation signal which is substantially equal to and opposite in phase to the transmitter noise and distortion signal component;

h) combining the cancellation signal with the received signal so as to effectively eliminate the transmitter noise and distortion signal component from the received signal thereby leaving substantially only the undistorted signal component, the undistorted signal component including a main signal component and a secondary signal component generated by the transmitter output signal, the secondary signal component having a frequency that is proximate to the frequency of the main signal component;

i) filtering the undistorted signal component with the frequency tunable filter circuit to effectively eliminate the secondary signal component from the undistorted signal component thereby leaving substantially only the main signal component; and j) providing the main signal component to the corresponding transceiver for processing.

25. A device for the cosite processing of interference between radio transceivers comprising at least one transmission/reception antenna coupled to N transceivers by means of N transmission channels of a multicoupler, wherein said device comprises N agile filters placed respectively on each of the transmission channels and an N-channel interference cancellation device coupled between the N transmission channels and one reception channel common to all the radio transceivers to cancel interfering signals produced by at least one transmitted signal generated by the radio transceivers and present in a received signal on the reception channel wherein the received signal from the common reception channel is being provided to each of the N agile filters for processing therein.

26. A device according to claim 25 wherein the N-channel interference cancellation device further comprises at least one modulator of a sample of the at least one transmitted signal, the at least one modulator being coupled to at least one demodulator of a sample of the interfering signals, the device generating at least one modified signal, in response to the at least one modulator and the at least one demodulator, and mixing the at least one modified signal with the received signal present at the one reception channel common to all of the radio transceivers, and substantially canceling the interfering signals when the at least one modified signal has a substantially similar amplitude and a substantially opposite phase with respect to the interfering signals.

27. A device according to claim 26 wherein the at least one demodulator provides, and the at least one modulator is responsive to, in phase components and quadrature phase components of the sample of the interfering signals.

28. A device for the cosite processing of interference between radio transceivers comprising at least one transmission/reception antenna coupled to N transceivers by means of N transmission channels of a multicoupler, wherein said device comprises N agile filters placed respectively on each of the transmission channels, the N agile filters being organized to work in one of a simplex mode and a duplex mode, and an N-channel interference cancellation device coupled between the N transmission channels and one reception channel common to all the radio transceivers to cancel interfering signals produced by at least one transmitted signal generated by the radio transceivers and present in a received signal on the reception channel, wherein the received signal from the common reception channel is being provided to each of the N agile filters for processing therein.

29. A device according to claim 28, wherein each of the N agile filters working in duplex mode comprises a first variable tunable filter and a second variable tunable filter interposed between a first hybrid coupler (90°, 3 dB) and a second hybrid coupler (90°, 3 dB), a circuit for the instantaneous measurement of a frequency associated with a signal applied to an input of the first hybrid coupler to control the frequency for tuning the filters to a measured frequency, and a change-over switch to carry out wideband monitoring.

* * * * *